United States Patent [19]

Neuroth et al.

[11] 4,451,305
[45] May 29, 1984

[54] APPARATUS AND METHOD FOR PRODUCING AN INSULATED CONNECTION BETWEEN ELECTRICAL CABLES

[75] Inventors: David H. Neuroth, Bethany; Robert F. Smith, Jr., Oxford, both of Conn.

[73] Assignee: Harvey Hubbell Incorporated, Orange, Conn.

[21] Appl. No.: 404,512

[22] Filed: Aug. 2, 1982

[51] Int. Cl.³ .............................................. H02G 1/14
[52] U.S. Cl. ..................................... 156/49; 29/868; 156/245; 156/53; 174/84 R; 174/92; 249/95; 249/98; 264/272.13; 264/272.14; 264/272.15; 403/269; 425/123
[58] Field of Search ............... 24/68 B, 68 C, 68 TM; 29/868; 156/49, 414, 242, 245, 53; 174/21 R, 84 R, 91, 92; 249/95, 98; 264/272.13, 272.14, 272.15; 285/21, 284, 292; 403/265, 269; 425/123

[56] References Cited

U.S. PATENT DOCUMENTS

| 1,354,425 | 9/1920 | Sloper. | |
|---|---|---|---|
| 2,980,974 | 4/1961 | DeSantis | 24/68 B |
| 3,178,793 | 4/1965 | Garten, Jr. et al. | 425/13 |
| 3,586,057 | 6/1971 | Lambert | 138/99 |
| 4,084,307 | 4/1978 | Schultz et al. | 29/460 |
| 4,091,062 | 5/1978 | Nelson | 264/85 |
| 4,204,896 | 5/1980 | Richardson | 156/49 |
| 4,268,329 | 5/1981 | Jervis | 156/51 |

FOREIGN PATENT DOCUMENTS 1363629  8/1974  United Kingdom ................. 156/49

Primary Examiner—Robert A. Dawson
Attorney, Agent, or Firm—Jerry M. Presson

[57] ABSTRACT

An apparatus and method for producing an insulated connection between a pair of insulated electrical cables by means of curing uncured insulation wrapped around joined conductors in the cables. The apparatus comprises a multiple part mold assembly having a cylindrical cavity, mechanisms for heating and cooling the mold parts and an assembly for creating a radially inwardly directed, substantially constant pressure on the curing insulation while allowing radial expansion and contraction of the insulation and mold parts during heating and cooling. The pressure-creating assembly comprises a pair of rectilinear power devices and a pair of cables wrapped around the mold parts and tensioned by the power devices, this assembly applying a radially inwardly directed, equal and substantially constant force to the mold parts. Preferably, the mold assembly comprises three equal parts, each defining one-third of a cylindrical body and each having rollers on the outer surface for receiving the cables therein.

15 Claims, 5 Drawing Figures

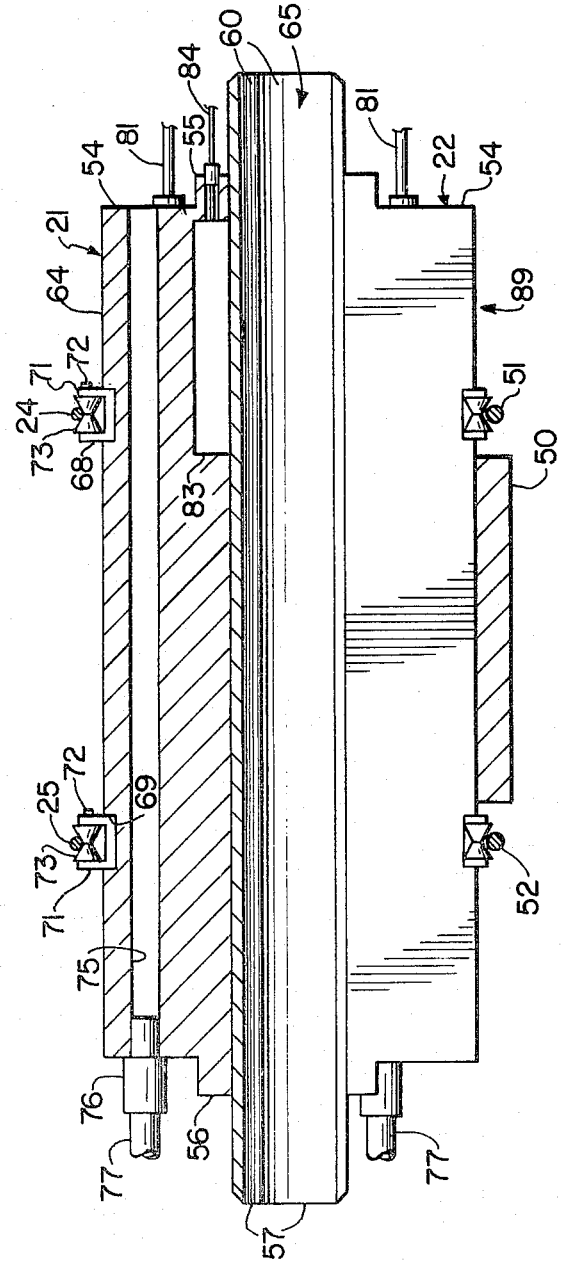
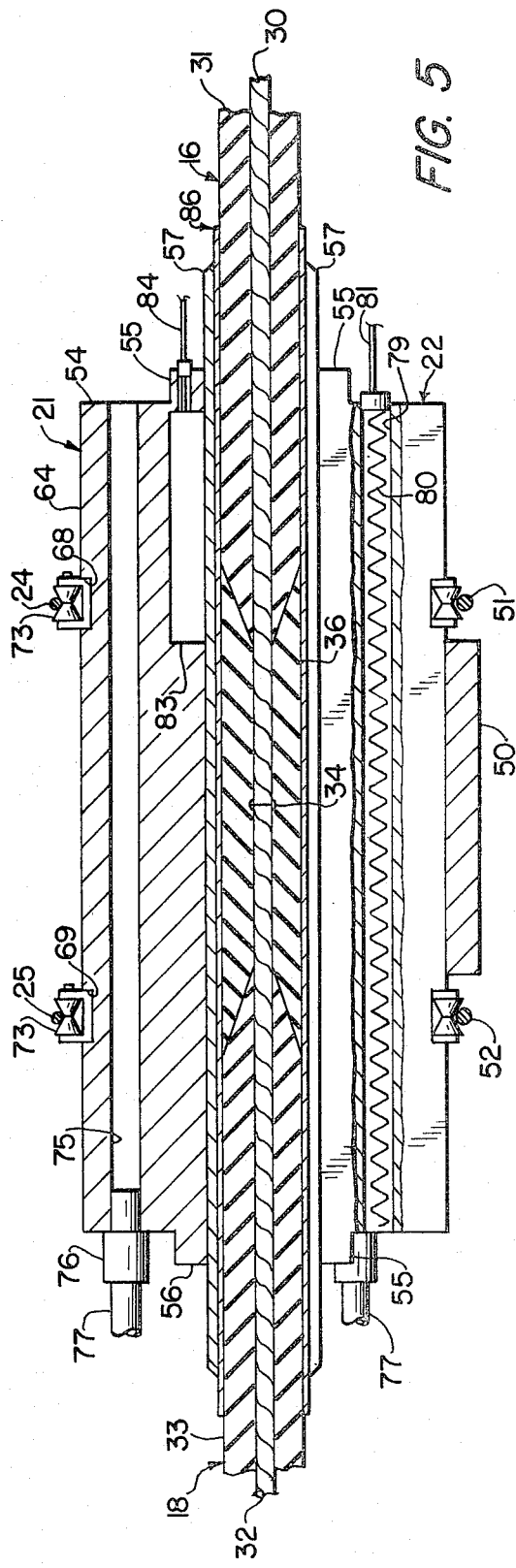
FIG. 4
FIG. 5

APPARATUS AND METHOD FOR PRODUCING AN INSULATED CONNECTION BETWEEN ELECTRICAL CABLES

FIELD OF THE INVENTION

The invention relates to an apparatus and method for producing an insulated connection between electrical cables. This is accomplished by means of a multiple part mold which encloses uncured insulation material covering joined cable conductors and which is heated and then cooled. The mold parts exert a radially inwardly directed, substantially constant pressure on the insulation during curing but are allowed to expand and contract during this curing process. This pressure is created by applying a radially inwardly directed, equal and substantially constant force to the mold parts by means of cables wrapped around the mold parts and tensioned by rectilinear power devices, such as pneumatic cylinders.

BACKGROUND OF THE INVENTION

In splicing electrical cables, such as high voltage insulated cables, both the central conductors and the cylindrical layers of insulation must be joined. Commonly, the metallic conductors of the two cables to be joined are simply butt welded. To provide a continuous insulation layer over the joined conductors, the insulation is typically removed from the ends of the conductors before joining, the conductors are joined and then uncured insulation material is placed over the joined conductors which is then cured. This curing takes place under heat and pressure and allows the uncured insulation to cure and fuse with the adjacent insulation remaining on the cables.

This curing operation is critical since, if it is not done correctly, the overall splice will be defective. That is, if the cured insulation is not uniform in diameter or there are air voids, the electrical insulation dielectric strength will be reduced.

While there are known prior art devices for producing an insulated connection between electrical cables, they suffer from numerous disadvantages. Thus, many of them are quite complicated to manufacture and operate, while others tend to leave air voids in the insulation and do not provide a uniform diameter and uniform concentricity of the insulation. Moreover, many of the prior art devices are not reliable or portable in operation. In addition, it is important to maintain a substantially constant pressure on the curing insulation during both heating and cooling although many of the prior art devices do not accomplish this.

Examples of some of these and related prior art devices are disclosed in the following U.S. Pat. Nos.: 1,354,425 to Sloper; 3,178,703 to Rosengarten, Jr. et al; 3,586,057 to Lambert; 4,084,307 to Schultz et al; 4,091,062 to Nelson; 4,204,896 to Richardson; and 4,268,329 to Jervis.

SUMMARY OF THE INVENTION

Accordingly, a primary object of the invention is to provide an apparatus and method for producing an insulated connection between electrical cables that provides a homogeneous insulation layer without air voids and with a uniform diameter and concentricity.

Another object of the invention is to provide such an apparatus and method that is simple and reliable.

Another object of the invention is to provide such an apparatus that is easy to operate and is portable.

A further object of the invention is to provide such a method that includes applying a substantially constant pressure to the curing insulation during both heating and cooling.

The foregoing objects are basically attained by providing an apparatus for producing an insulated connection between a pair of electrical cables having joined conductors with uncured insulation material surrounding these conductors and interposed between cylindrical insulation surrounding the remaining parts of these conductors, the combination comprising a sheath enclosing the uncured insulation material therein; a multiple part mold assembly defining a generally cylindrical mold cavity receiving the insulation material and the sheath therein; means for heating the mold parts and the insulation material to cure the insulation material; means for cooling the mold parts and the insulation material after heating the insulation material; and means, coupled to said mold parts, for applying a radially inwardly directed, equal and substantially constant force to said mold parts while allowing the uncured insulation material and the mold parts to expand radially outwardly due to thermal expansion of the insulation material upon heating thereof and while allowing the insulation material and the mold parts to contract radially inwardly upon cooling thereof.

In a preferred embodiment, the mold assembly comprises three parts, each part having an inner and outer surface defining a one-third portion of a cylindrical body. The means for applying the force comprises a pair of cables wrapped around the three parts, received in rollers attached to these parts, and tensioned by means of a pair of pneumatic cylinders.

The foregoing objects are also basically attained by providing a method of splicing a pair of electrical cables, each comprising a conductor surrounded by a cylindrical layer of insulation, comprising the steps of removing the insulation adjacent the end of each electrical cable, joining the ends of the conductors on the pair of electrical cables, interposing uncured insulation material between the areas of removed insulation and around the joined conductors, wrapping the uncured insulation material in a thin sheath of material, enclosing the uncured insulation material and sheath in a generally cylindrical mold cavity formed by a multiple part rigid mold, heating the multiple parts of the mold to cure the uncured insulation material while allowing the uncured insulation material and the parts of the mold to expand radially outwardly due to thermal expansion of the insulation material, cooling the multiple parts of the mold while allowing the insulation material and the parts of the mold to contract radially inwardly, and simultaneously with the heating and cooling steps, applying a radially inwardly directed, equal and substantially constant force to each of the parts of the mold.

In a preferred embodiment, the step of applying the radially inwardly directed equal and constant force to each of the parts of the mold comprises the steps of wrapping a cable around the mold parts and tensioning the cable under a constant force.

Other objects, advantages and salient features of the present invention will become apparent from the following detailed description which, taken in conjunction with the annexed drawings, discloses a preferred embodiment of the invention.

DRAWINGS

Referring now to the drawings which form a part of this original disclosure:

FIG. 4 is a front elevational view in longitudinal section taken along lines 4—4 in FIG. 2 showing two of the mold parts without the electrical cables received therein; and FIG. 5 is a front elevational view in section similar to that shown in FIG. 4 except that the electrical cables to be joined are shown.

DETAILED DESCRIPTION OF THE INVENTION

Figure 1:
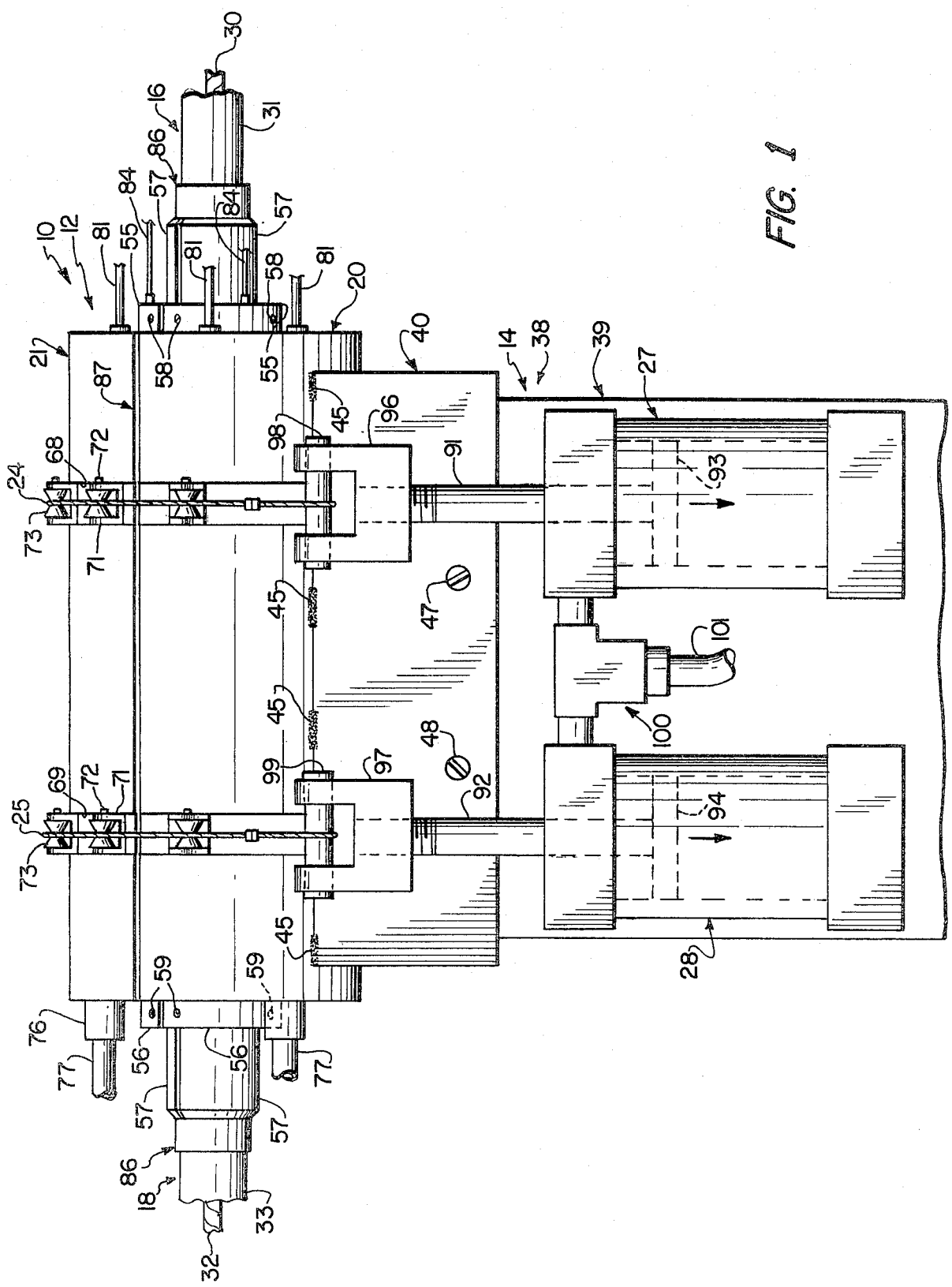
FIG. 1 is a front elevational view of the apparatus in accordance with the invention shown with two electrical cables received therein during production of the insulated connection therebetween.

As seen in FIGS. 1–5, the apparatus 10 for producing the insulated connection between electrical cables in accordance with the invention comprises a mold assembly 12 and a force-applying assembly 14 for connecting first and second electrical cables 16 and 18. The mold assembly 12 comprises first, second and third mold parts 20, 21 and 22 and the force-applying assembly 14 comprises first and second cables 24 and 25 wrapped around the mold parts and first and second pneumatic cylinders 27 and 28 to tension these cables.

As best seen in FIG. 5, the first electrical cable 16 comprises a central metallic conductor 30 surrounded by a substantially cylindrical layer of insulation 31 and similarly the second electrical cable 18 comprises a central conductor 32 and insulation 33. The conductors are typically formed from copper or a combination of tin and copper while the insulation is typically formed of rubber, ethylene-propylene-rubber, cross-linked polyethylene or ethylene-propylene-diamine. In addition to the cylindrical layers of insulation 31 and 33 there can also be a thin layer of voltage stress control insulation interposed between the conductor and the insulation. As seen in FIG. 5, the insulation 31 and 33 is removed from the first and second cables 16 and 18 adjacent the ends of the conductors to be joined and the conductors are joined by a butt weld 34. Uncured insulation material 36, of a material similar to that of insulation 31 and 33, is interposed between the tapered ends of insulation 31 and 33 and surrounds the exposed, joined conductors 30 and 32. Advantageously, this uncured insulation material 36 is applied completely around the conductors and tapered parts of the insulation. In addition to the insulation material 36 shown in FIG. 5, an additional layer of voltage stress control insulation can be interposed between insulation material 36 and conductors 30 and 32. In all events, the insulation material 36 is applied around the conductors so that the outer diameter thereof is slightly larger than the outer diameter of insulation 31 and 33.

It is to this uncured insulation material 36 that the apparatus 10 applies pressure and heat and then cools to cure the material and provide the insulated connection between electrical cables 16 and 18.

Figure 3:
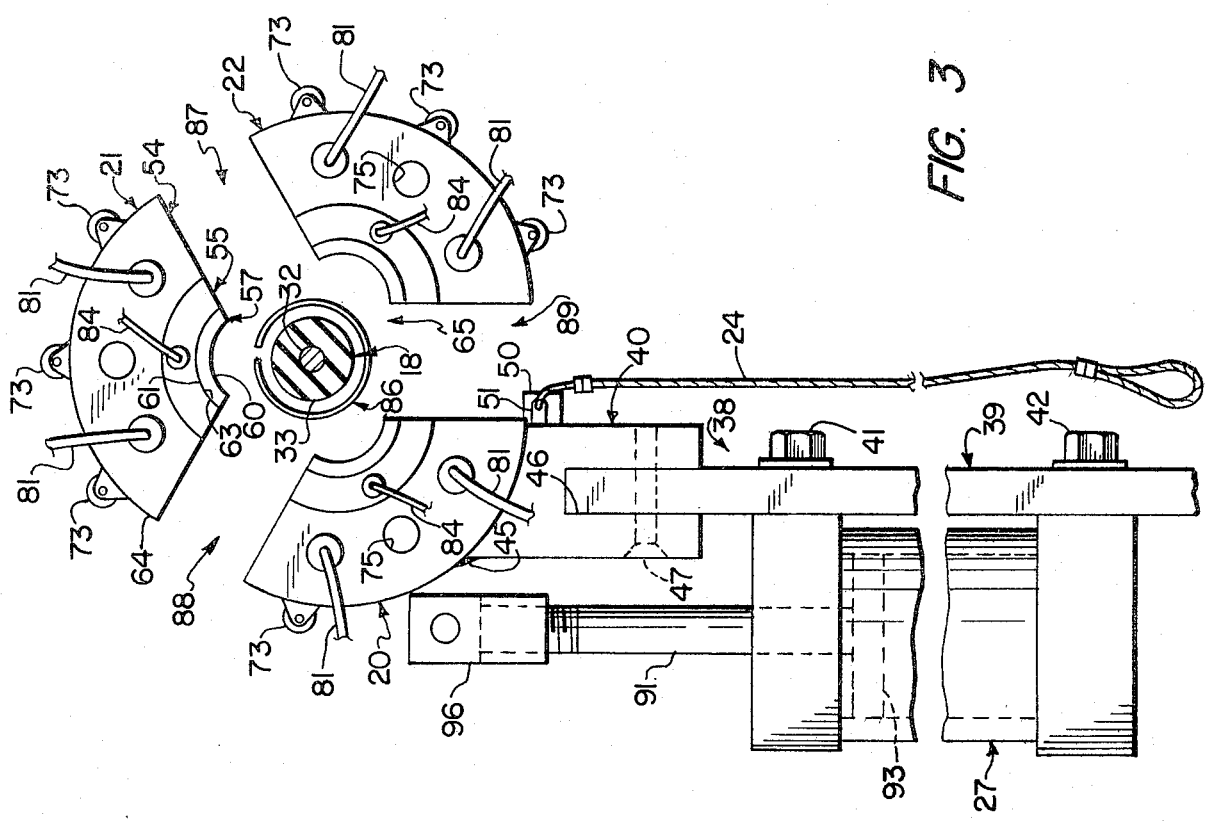
FIG. 3 is a right side elevational view of the apparatus shown in FIG. 1 with the mold parts being shown exploded and with the cables removed from these mold parts.
Figure 2:
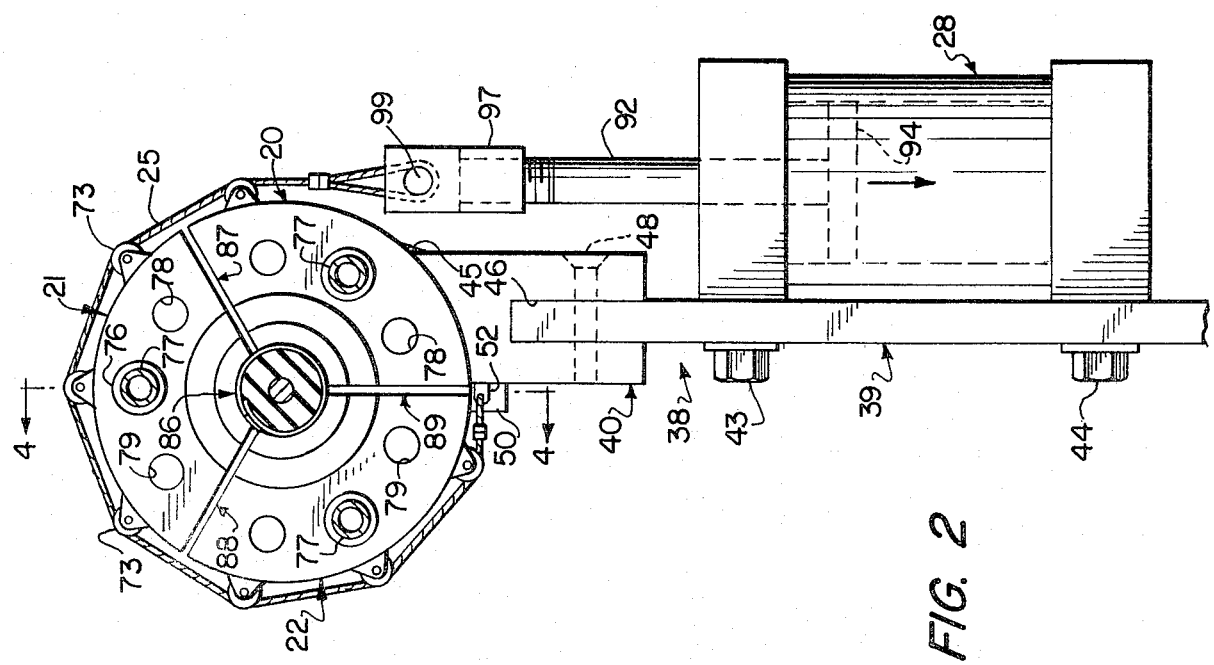
FIG. 2 is a left side elevational view of the apparatus shown in FIG. 1.

Referring to FIGS. 1–3, for ease of operation, the mold assembly 12 and force-applying assembly 14 are connected to a support 38 comprising a rectangular plate 39 of low thermal conductivity formed for example of Micarta and a base member 40 formed for example of aluminum. The pair of pneumatic cylinders 27 and 28 are connected to plate 39 by means of bolts 41–44 and base member 40 has a curved upper surface in contact with mold part 20 which are coupled together by means of weld lines 45. A downwardly facing rectangular slot 46 in the base member 40, as seen in FIGS. 2 and 3, receives plate 39 therein which is rigidly connected thereto by means of screws 47 and 48, these screws being received in suitable threaded bores in base member 40.

An elongated bar 50 is rigidly connected to base member 40 by means of, for example, screws just below mold part 20 as seen in FIG. 3 to support the bottom of mold part 22 thereon as seen in FIG. 2. Extending outwardly from base member 40 are two eye bolts 51 and 52 which are suitably rigidly attached to the base member, such as by providing threaded bores therein. As seen in FIGS. 2 and 3, containment cables 24 and 25 have their first ends coupled to eye bolts 51 and 52, respectively.

The mold assembly 12 comprising the first, second and third mold parts 20, 21 and 22 is capable of relative radial movement with regard to electrical cables 16 and 18 as indicated in the exploded view shown in FIG. 3. Each of the three mold parts is substantially identical with mold part 20 being rigidly coupled to base member 40. Each of the mold parts has a main body portion 54 with flanges 55 and 56 at opposite ends and an inner member 57 rigidly coupled via screws 58 and 59 to the flanges. As seen in FIGS. 1, 4 and 5, the ends of the inner member extend past the flanges. Each inner member has an inner and outer surface 60 and 61 which define one-third of a cylindrical surface with the entire inner member defining one-third of a cylindrical body and therefore including an arc of 120°. The main body portion of each mold part forms one-third of a cylindrical body and has an inner surface 63 and an outer surface 64 in the form of one-third of a cylindrical surface, as best seen in FIG. 3.

Each of the main body portions and the inner members are preferably formed from aluminum with the inner surfaces 60 of the three inner members 57, each associated with one of the mold parts, defining a generally cylindrical mold cavity 65 for the reception of the electrical cables. Each of the mold parts outer surface 64 has a pair of external grooves 68 and 69 as seen best in FIGS. 1 and 4. Rigidly received in each groove is at least one yoke 71 having a horizontally extending shaft 72 received therein for rotatably supporting a roller 73 thereon. Advantageously, the yokes are bolted to the mold parts and each roller has a V-shaped groove therein for the reception of containment cables 24 and 25 as seen best in FIGS. 1, 2, 4 and 5. As seen in FIGS. 2 and 3, mold part 20 has one roller in each groove while mold parts 21 and 22 have three rollers in each groove, these rollers being equally circumferentially spaced.

As best seen in FIG. 4, each mold part main body portion has a central through-bore 75 which rigidly receives a connector 76 at one end which is in turn connected to an air line 77 to deliver cooling air to each of the mold parts. A second pair of through-bores 78 and 79 as best seen in FIGS. 2 and 5 are provided in each mold part in the main body portion on opposite sides of the central through-bore 75, each of these through-bores 78 and 79 receiving an electrical heating element 80 therein, as seen in FIG. 5. Each of these heating elements has a wire 81 extending therefrom to a source of electricity.

As seen in FIG. 4, a temperature detecting device such as a thermistor 83 is located in a suitable recess in the main body portion 54 of each mold part in contact with inner member 57 and has a wire 84 extending through a suitable bore in flange 55 to a temperature gauge in order to determine the actual temperature of the inner member 57 as heat is applied by the heating elements 80. Thus, the heat supplied by the heating elements can be varied as necessary upon detection and measurement of the actual heat of the inner members by means of the thermistors.

As seen in FIGS. 1-3 and 5, before the electrical cables 16 and 18 are placed in the mold cavity 65 defined by the inner members 57 of the three mold parts, a thin sheath 86 formed of steel having a thickness of about 0.002 inch is wrapped around the electrical cables. This sheath 86 extends past the inner members as seen in FIGS. 1 and 5. This sheath is used so that the insulation material 36 does not ooze out through the slots 87, 88 and 89 between the mold parts during heating.

As mentioned above, the force-applying assembly 14 comprises the two containment cables 24 and 25 and two rectilinear power devices in the form of the two pneumatic cylinders 27 and 28. The second ends of these cables 24 and 25 are coupled to the pneumatic cylinders as seen in FIG. 1 and 2 by means of piston rods 91 and 92 associated with the two pneumatic cylinders. Thus, piston rods 91 and 92 have pistons 93 and 94 rigidly coupled at one end and received in the cylinders and a pair of clevises 96 and 97 received at the opposite ends. A pair of pins 98 and 99 pass through suitable bores in each of the clevises and receive the looped second ends of cables 24 and 25 therein as seen specifically in FIGS. 1 and 2. These pins 98 and 99 can be removed from the clevises to disconnect the cables from the piston rods as shown in FIG. 3.

To deliver compressed air to the pneumatic cylinders 27 and 28, a T-connector 100 is coupled to each of the cylinders and has an air line 101 suitably connected thereto and connected to a source of compressed air.

OPERATION

In using the apparatus 10 shown in FIGS. 1-5 to produce an insulated connection between electrical cables 16 and 18, the first step is to remove the insulation 31 and 33 adjacent the end of each electrical cable and then join the ends of the conductors 30 and 32 such as by welding as seen in FIG. 5.

Then, the uncured insulation material 36 is interposed between the areas of the removed insulation and around the joined conductors.

Next, the thin sheath 86 is wrapped around the uncured insulation material 36 and the sheath and uncured insulation material are enclosed in the mold cavity 65 formed by the three mold parts 20, 21 and 22 as seen in FIG. 3. These mold parts are placed in a configuration shown in FIG. 2 so that the inner members 57 thereof contact the sheath 86 with slots 87-89 being maintained so that the mold parts do not contact each other.

At this time, the containment cables 24 and 25 are wrapped around the mold parts so that they are received in rollers 73 and their second ends are coupled to the piston rods 91 and 92 as seen in FIGS. 1 and 2.

Next, compressed air is introduced in air line 101 to drive pistons 93 and 94 downwardly as seen in FIGS. 1 and 2 to tension cables 24 and 25. In this regard, it should be noted that, as seen in FIG. 2, the the first and second ends of these cables are tensioned so that they are substantially tangential to the outer cylindrical surface defined by the three mold parts. The tensioning of these cables applies a radially inwardly directed equal force to each of the parts of the mold and this force is maintained at a substantially constant level by means of delivering a substantially constant force of compressed air to the cylinders. This radially inwardly directed force also creates a substantially constant pressure on the insulation material, this pressure varying only slightly as the mold parts and uncured insulation material expand and contract during heating and cooling.

Thus, once the radially inwardly directed force is directed to the mold parts, the multiple parts of the mold are heated to cure the uncured insulation while allowing the uncured insulation and the parts of the mold to expand radially outwardly due to the thermal expansion of the insulation material. This is accomplished because the outwardly directed force caused by the expanding insulation is slightly greater than the inwardly directed force created by the pneumatic cylinders.

After a sufficient heating period, the multiple parts of the mold are cooled while allowing the insulation material and the parts of the mold to contract radially inwardly. This is accomplished since the force on the mold parts is maintained substantially constant.

As is evident, the heating takes place by means of activating the electrical heating elements 80 and the cooling takes place by means of conducting cooling air through the mold parts via air lines 77.

By following this method, the insulation material is under pressure of a substantially constant amount during heating and cooling and therefore cures without air voids and in a uniform diameter.

This is accomplished by maintaining the pressure and temperature combination exerted on the curing insulation to satisfactorily cure the material. Thus, the force exerted by the pneumatic cylinders is set at a level that will guarantee this internal pressure in the mold cavity while allow outward expansion.

In a typical situation, the illustrated apparatus 10 can be used with electrical cable having a tin-copper conductor and a rubber insulation layer with an outer diameter of about one inch, wherein the inner diameter of the inner members 57 on the mold parts is about 1.10 inches. The thickness of the sheath 86 is about 0.002 inch and the uncured insulation material is placed around the joined conductors so that the outer diameter thereof is slightly greater than the one inch dimension. The pneumatic cylinders have about 2.0 inch inner diameters and are set at the pressure levels which in turn develop a desired pressure inside the mold cavity 65. The heating elements 80 are turned on and regulated so that the mold cavity reaches a desired curing temperature within about one-half hour, the curing insulation material 36 is subjected to this temperature for about an hour and then the heating elements are turned off and cooling air is delivered to the mold parts for about one-half hour. In this example, the radius of the containment cables 24 and 25 is about 3.50 inches when under tension but before heating and this diameter increases to about 3.60–3.70 inches under thermal expansion of the insulation material during heating. This thermal expansion is typically about 10 to 20% of the radius of the curing insulation material so that there is a radial expansion of from about 0.050 to 0.100 inch. This results in a decrease of pressure created by the mold parts on the order of 2.77–5.41% which is figured as 0.1 inch divided by 3.60 inches to 0.2 inch divided by 3.70 inches.

Thus, the pressure on the curing insulation material in this example reduces only a small percentage, thereby providing a substantially constant pressure.

Once cooling is finished, the mold parts are removed and any extra diameter on the cured insulation is sanded off.

While one advantageous embodiment has been chosen to illustrate the invention, it will be understood by those skilled in the art that various changes and modifications can be made therein without departing from the scope of the invention as defined in the appended claims.

What is claimed is:

1. An apparatus for producing an insulated connection between a pair of electrical cables having joined conductors with uncured insulation material surrounding these conductors and interposed between cylindrical insulation surrounding the remaining parts of these conductors, the combination comprising:
   a sheath enclosing the uncured insulation material therein;
   a multiple part mold assembly defining a generally cylindrical mold cavity receiving the insulation material and said sheath therein;
   means for heating said mold parts and the insulation material to cure the insulation material;
   means for cooling said mold parts and the insulation material after heating the insulation material; and
   means, coupled to said mold parts, for applying a radially inwardly directed, equal and substantially constant force to said mold parts, while allowing the uncured insulation material and said mold parts to expand radially outwardly due to thermal expansion of the insulation material upon heating thereof and while allowing the insulation material and said mold parts to contract radially inwardly upon cooling thereof.

2. An apparatus according to claim 1, wherein said mold assembly comprises three parts, each having an inner surface defining one-third of a cylindrical surface.

3. An apparatus according to claim 2, wherein each of said three parts has an outer surface defining one-third of a cylindrical surface.

4. An apparatus according to claim 1, wherein said means for heating comprises a heating element coupled to each of said mold parts.

5. An apparatus according to claim 4, wherein each of said mold parts has a bore therein receiving one of said heating elements.

6. An apparatus according to claim 1, wherein said means for cooling comprises a bore in each of said mold parts for conducting cooling air therethrough.

7. An apparatus according to claim 1, wherein said means for applying a force to said mold parts comprises a rectilinear power device.

8. An apparatus according to claim 7, wherein said rectilinear power device comprises a cylinder, a piston received in said cylinder and a piston rod coupled to said piston and extending from said cylinder.

9. An apparatus according to claim 7, wherein said means for applying a force to said mold parts further comprises
   a cable having first and second ends, the first end thereof being rigidly coupled to one of said mold parts and the second end thereof being rigidly coupled to said rectilinear power device, and
   roller means, located on the outer surfaces of each of said mold parts, for receiving said cable therein between said first and second ends.

10. An apparatus according to claim 9, wherein said mold assembly comprises at least three parts, each part having an outer surface defining an equal portion of a cylindrical surface.

11. An apparatus according to claim 10, wherein said cable first and second ends each extend tangentially to the cylindrical surface defined by said outer surfaces of said mold parts.

12. An apparatus according to claim 1, wherein said mold assembly comprises at least two parts, each part having a cross section defining an equal portion of a cylindrical body.

13. A method of splicing a pair of electrical cables, each comprising a conductor surrounded by a cylindrical layer of insulation, comprising the steps of
   removing the insulation adjacent the end of each electrical cable,
   joining the ends of the conductors on the pair of electrical cables,
   interposing uncured insulation material between the areas of removed insulation and around the joined conductors,
   wrapping the uncured insulation material in a thin sheath of material,
   enclosing the uncured insulation material and sheath in a generally cylindrical mold cavity formed by a multiple part mold,
   heating the multiple parts of the mold to cure the uncured insulation material while allowing the uncured insulation material and the parts of the mold to expand radially outwardly due to thermal expansion of the insulation material,
   cooling the multiple parts of the mold while allowing the insulation material and the parts of the mold to contract radially inwardly, and
   simultaneously with the heating and cooling steps, applying a radially inwardly directed, equal and substantially constant force to each of the parts of the mold.

14. A method according to claim 13, wherein the cooling step comprises the step of
   directing cooling air at each of the mold parts.

15. A method according to claim 13, wherein the applying step comprises the steps of
   wrapping a cable around the mold parts, and
   tensioning the cable under a constant force.

* * * * *